United States Patent [19]
Shao et al.

[11] Patent Number: 5,614,098
[45] Date of Patent: Mar. 25, 1997

[54] NOCARDIA FOAMING CONTROLLING METHOD OF WASTE WATER TREATMENT

[76] Inventors: Y. J. Shao, 4824 Hollow Corner Rd. 260, Culver City, Calif. 90230; Konstadinas Kaporis, 772 Mira Mar Ave., Long Beach, Calif. 90804

[21] Appl. No.: 425,895

[22] Filed: Apr. 21, 1995

[51] Int. Cl.$^6$ ........................................ C02F 3/12
[52] U.S. Cl. .................. 210/608; 210/631; 210/626
[58] Field of Search ................................ 210/608, 611, 210/621–626, 631, 732–736

[56] References Cited

U.S. PATENT DOCUMENTS

| | | | |
|---|---|---|---|
| 3,622,508 | 11/1971 | Komline ................................. | 210/608 |
| 3,658,697 | 4/1972 | Huether ................................. | 210/631 |
| 4,173,532 | 11/1979 | Keoteklian ............................. | 210/631 |
| 5,240,600 | 8/1993 | Wang et al. ............................ | 210/631 |
| 5,364,529 | 11/1994 | Morin et al. ........................... | 210/608 |

*Primary Examiner*—Thomas G. Wyse
*Attorney, Agent, or Firm*—David Woon Lee; David & Raymond Patent Firm

[57] ABSTRACT

A nocardia foaming controlling method of waste water treatment includes a step of injecting cationic polymer to a retention activation sludge line within the final clarifiers of the traditional waste water treatment process. When polymer is returned along with retention activation sludge to the aeration basins, the polymer's hydrophilic nature reduces the surface tension created between air bubbles and nocardia enriched floc. This allows nocardia to pass through the aeration basins, to eventually escape the treatment system.

6 Claims, 4 Drawing Sheets ns ate equipped with defoaming spraying equipment.

NOCARDIA FOAMING CONTROLLING METHOD OF WASTE WATER TREATMENT

BACKGROUND OF THE PRESENT INVENTION

The present invention relates to waste water treatment, and more particularly to a nocardia foaming controlling method of waste water treatment which is a solution to the nocardia foaming problems by controlling nocardia foaming.

Nocardia spp. is a branched filamentous microorganisms that produce a brown, viscous foam in many activated sludge plants. Due to the tenacious nature of the foam, serious problems can develop as foam accumulates. Slippery walkings and odors result when foam overflows aeration basin walls. Foam flowing over or under clarifier baffles increases effluent suspended solids and can freeze on clarifiers during cold weather that deteriorate the effluent quality and disrupt the treatment process. In addition, waste sludge containing Nocardia can cause serious foaming in anaerobic digesters.

Nocardia occurs in many different types of water pollution control plants with a variety of influent characteristics. Surveys performed by a number of researchers have found that Nocardia is one of the most commonly observed filamentous organisms in activated sludge plants in the United States. Though the causes of nocardia growth are not very well defined, it is commonly associated with long solids retention time, warmer temperatures, and grease, oil and fat present in the influent.

Existing nocardia control methods may be successful in alleviating some of the symptoms, but generally, there are no quick solutions and high foaming levels can linger for months. Furthermore some suggested methods for foam control can results in inadequate treatment, and deteriorated effluent quality. Chemical anti-foaming agents can be used to restrain foaming, but there are not effective as a long term solution. Disinfectants are also not successful because the amount often required to have an impact on nocardia can have adverse effects on the biological treatment either by resulting in floc dispersion or by limiting floc forming microorganisms.

Operational changes also have limited effect on nocardia and sometimes can have detrimental effects on the treatment process. Reducing aeration rates, or SRT can deteriorate effluent quality. Recent attempts involve using selectors at the head end of aeration basins, however this option can require significant capital modifications, and there effectiveness is not consistent for each plant. Other techniques, also of varying levels of success, include, the use of water spray, digester subnatent, and selective foam wasting.

Conventional sludge treatment process consists of bar screening, aerated grit removal, primary sedimentation, and activated sludge biological treatment. The sludge is anaerobically digested, dewatered and hauled for land applications. FIG. 1 is a schematic view of the conventional sludge treatment.

The biological aeration consists of none basins, which are generally operated in a serpentine flown pattern, with three tanks in each serpentine. The secondary treatment is characterized by the high ratio of recirculation (0.8) and the anoxic regions created to act as a selector for filamentous control. The flow outlets from the aeration basins are submerged, as well as gates between the basins themselves. The basins ate equipped with defoaming spraying equipment.

The conventional sludge treatment has long standing nocardia problems due to the industrial discharges it receives, especially from refineries and food processing facilities, and also due to the long sludge retention time (SRT). There have been incidents where excessive foaming has overflown the aeration basins creating slippery conditions on the walkways. Once nocardia has been established in the system control options have had limited success. Because of the hydrophobic nature of nocardia they float at the top of aeration basins and thus they are often trapped in the basins due to the design of the outlet.

Nevertheless, intensive research on this organism has, thus far, not yielded a control method that can be easily implemented in water pollution control plants.

SUMMARY OF THE PRESENT INVENTION

The main object of the present invention is to provide a nocardia foaming controlling method of waste water treatment which can solve the nocardia foaming problems by reducing the surface tension created between air bubbles and nocardia enriched floc that allows nocardia to pass through the aeration basins to eventually escape the sludge treatment system.

DETAILED DESCRIPTION OF THE PREFERRED EMBODIMENT

Figure 1:
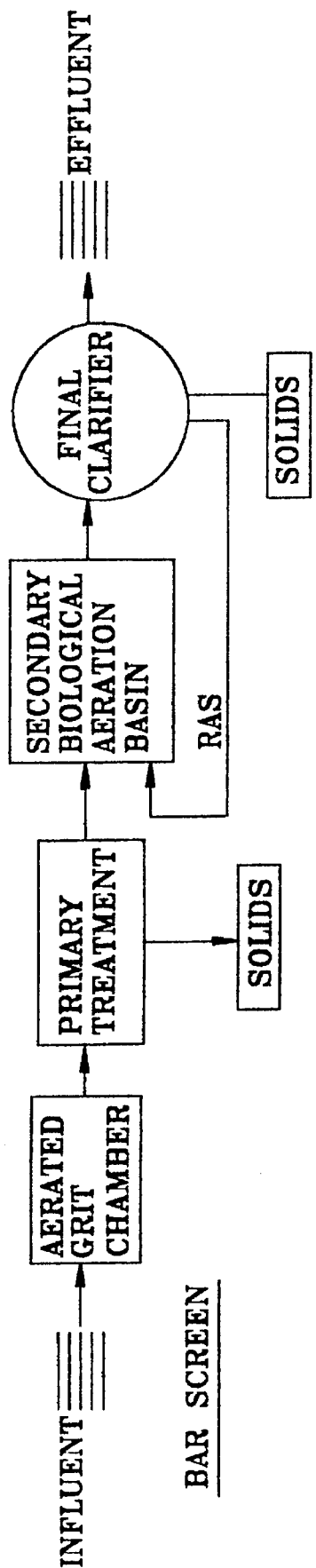
FIG. 1 is a schematic view of the traditional waste water treatment process.
Figure 2:
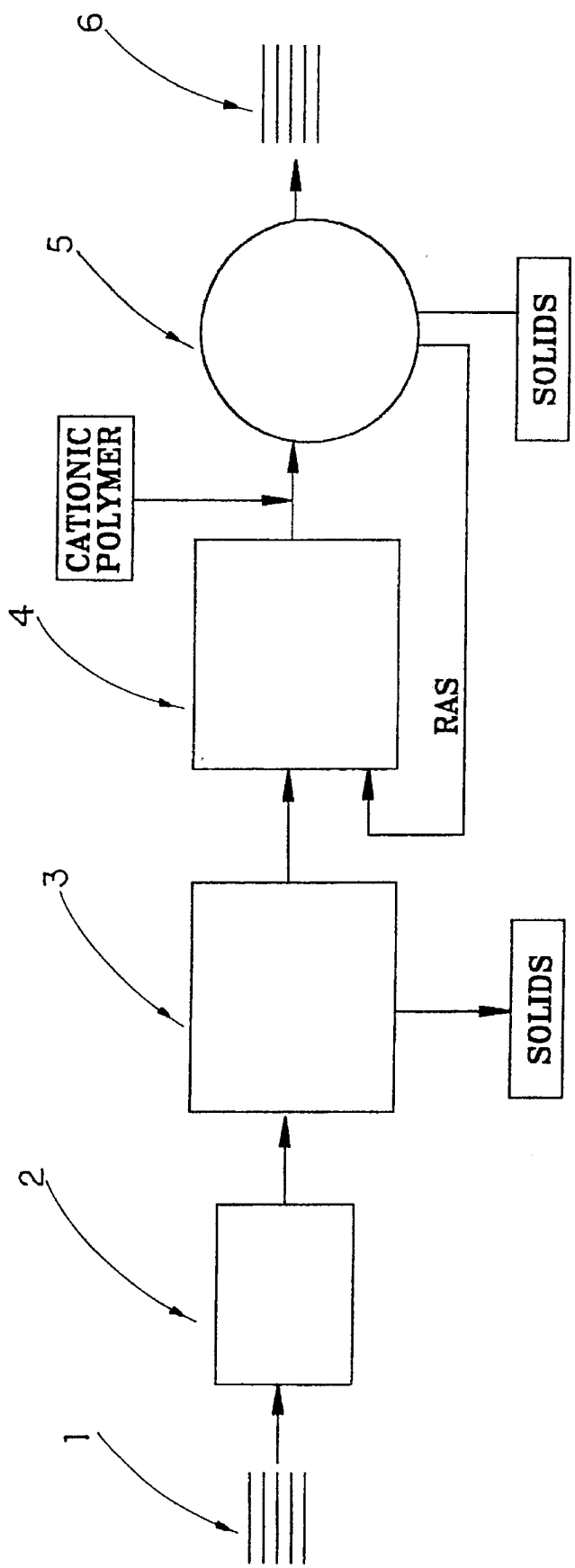
FIG. 2 is a schematic view of a sludge treatment process utilizing a nocardia foaming controlling method of a preferred embodiment according to the present invention.

Referring to FIG. 2, the present of a nocardia foaming controlling method of waste water treatment comprises the following steps.

Treat the waste water influent with a bar screen 1 or the similar device to rid of objects of large sizes present in the waste water stream.

The waste water coming through the bar screening stage is passed to a predetermined number of aerated grit removal chamber 2 where systematic aeration is first introduced into the waste water influent and grited. The materials alike are removal from the waste water stream.

The waste water coming out of the aerated grit removal chamber 2 is treated with primary sedimentation 3 by which most suspended solids are separated out.

The waste water stream coming out of the primary sedimentation 3 is passes to a predetermined number of secondary aeration basin 4 for biological aeration process wherein activated sludge is introduced.

A cationic polymer is injected or added into the waste water coming out of the secondary aeration basin 4. The polymer must be injected at a mixed liquor channel, though it is that it is the polymer recycled through retention activation sludge (RAS) that controls nocardia foaming.

The waste water stream after the injection or addition of the cationic polymer is passed to a predetermined number of clarifier 5 for clarifying treatment to acheive effluent 6 of clean water. It should be noted that the addition of the cationic polymer must be operated before the waste water entering into the clarifier 5.

The cationic polymer added to the secondary-treated waste water coming out of the secondary aeration basin should be operated before entering the clarifying stage which displaces the nocardia floc and prevent foaming by causing the bubbles to collapse. Under such circumstances, nocardia loses its buoyancy and defoaming effect can be achieved.

To monitor the effectiveness of polymer the percentage of the surface area of the aeration tanks covered by foam was recorded. At the same time qualification of the nocardia was suggested. A modification of the method for nocardia counting the technique is described below.

Prepare several clean frosted microscopic slides by marking the edges with a glass scribe at three equally spaced points along the length. On each slide place 80 µg/1 blended mixed liquor using a micropipette. Spread the liquid evenly over the entire nonfrosted area of the slide. Microscopically examine the slides at a magnification of 100× using phase contrast to check for even solids distribution over the slide. Discard slides showing uneven distribution such as clumping, bare spots or accumulation of solids along the slide edge. Gram stain using the Hucker modification. Count five slides at 1000× using oil immersion and normal illumination. Use a microscope eyepiece graticule with a line ruled on it. Then, (a) locate the scribe mark on the slide edge; (b) line up the eyepiece line with the scribe mark on the slide; (c) count any intersection with the eyepiece line of grampositive branched filaments of greater than 1 µm in length; (d) move across the slide to the opposite edge, counting all intersection with the Gram-positive filaments greater than 1 µm in length; (e) repeat the previous steps (a) through (f) at the two scribe marks on the slide; (f) average the number obtained for the three counts and express the results as "number of intersections/g VSS"; (g) repeat the previous procedures (a) through (f) for four more slides. Average the results of (f) and (g).

Figure 3:
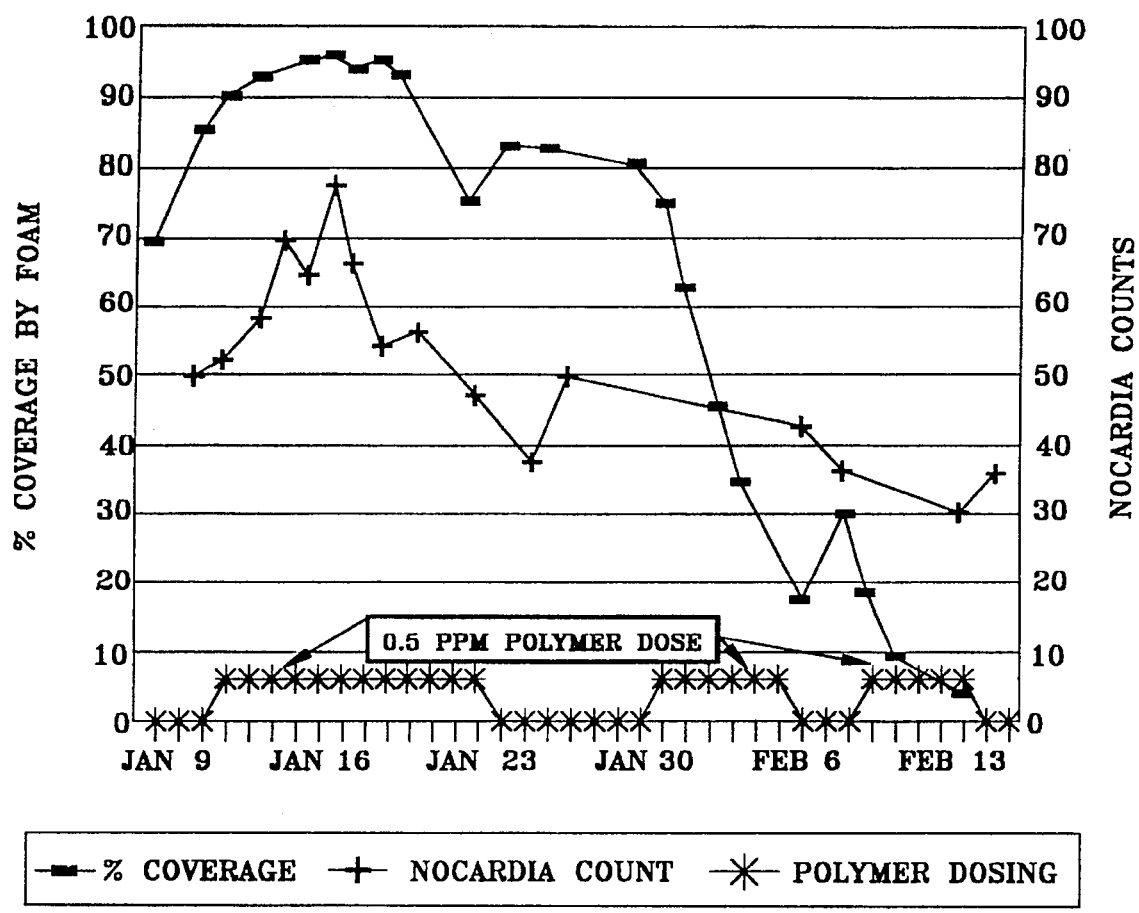
FIG. 3 is a graphic view illustrating the impact of polymer on foaming of the above embodiment of the present invention.

FIG. 3 summarizes the findings of the nocardia counting and foaming levels during the period of the latest foaming levels. As can been seen from the graph there was no immediate reaction of the foaming levels to polymer addition. Furthermore it is observed that there was a increase in nocardia concentrations leaving the aeration basins soon after polymer addition. This would indicate that the presence of polymer made it possible for more nocardia cells to escape the aeration basin and not get trapped at the top of the basins. The low response to the drop in foaming levels was attributed to the need to destabilize nocardia concentrations in the aeration's basins, and because there was no sludge wasting for four days. These occurred during the high hydraulic loading resulted from the heavy rains which resulted to poor setting. Once the operation returned to its normal state, better correlation between drop in foaming levels and polymer addition is observed. It is further observed that when polymer was discontinued foaming levels remained about the same.

Foaming is the collection of interfaces separated by air bubbles. In the case of nocardia foaming a surface tension is created between the air bubbles and the floc containing nocardia bacteria that tends to stabilize foams. The term hydrophilic used to describe nocardia is misleading because its the air entrapment that forces nocardia to float. In the case of the nocardia bacteria get trapped because of the submerged aeration basins outlets.

In the hydrophilic nature of cationic polymer, polymers are used extensively in water and wastewater treatment to enhance the overall coagulation process. The mechanism that is used is the ability of the long-chained charged polymers to destabilize colloids by forming a bridge between one colloid and another. In their interaction with nocardia floc however it however its their ability to lower the surface tension developed between nocardia and air bubbles that plays the main role in the controlling foaming.

Generally defoaming materials can be effective if they lower the surface tension more than the nocardia floc. It will then, displace the floc and cause the foam to collapse. Once this happens nocardia loses its buoyancy allowing it to pass through the aeration basins. It is therefore hypothesized that polymer has that effect.

According to the present invention the cationic polymer dose of 0.5 ppm is the most effective nocardia foaming control agent. The polymer should be injected at the mixed liquor channel, though it is most likely that it is the polymer recycled through retention activation sludge (RAS) that controls nocardia foaming. "The polymer's effectiveness is most likely due to its interaction with nocardia floc and its hydrophilic nature.

A way of exploring the effectiveness of polymer as a nocardia foaming control agent made to the industry is described in the following with reference to FIG. 4.

1. Polymer addition should be considered as a foaming control option.
2. Before the installation of any permanent injection lines, polymer should be tried on a temporary basis.
3. FIG. 4 shows a polymer injection system. It should be noted that the polymer is injected at the RAS fine. Several injection points including the mixed liquor channel, the head-end of the aeration basins, or spraying on top of the basins should be considered.

Figure 4:
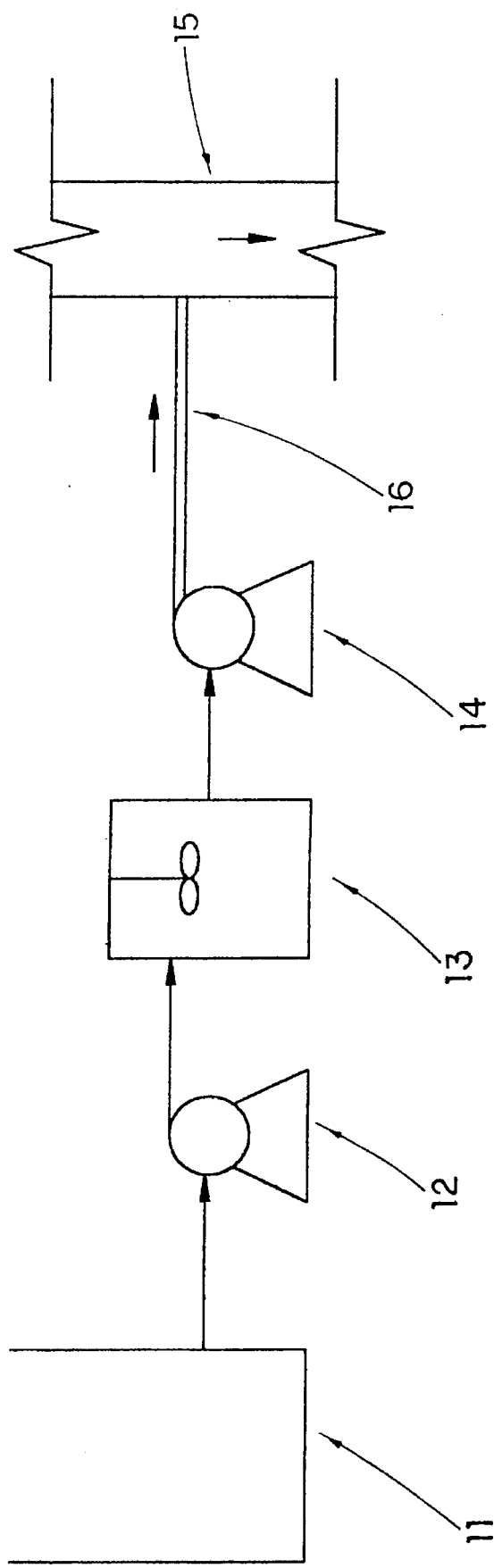
FIG. 4 is a schematic view of a polymer injection line of the above embodiment of the present invention.

Referring to FIG. 4, the cationic polymer injection line comprises a polymer tank 11 which stores the polymer raw material, a mixing pump 12 for pumping the polymer out of the tank, a mixing tank 13 inwhich the polymer is mixed and stored therein, a dosing pump 14 for making dose of polymer with 0.5 ppm and injecting to a retention activation sludge line 15 of the waste water treatment system through a PVC piping 16.

We claim:

1. A nocardia foaming controlling method of waste water treatment comprising the following steps:

(a) treating the waste water influent with a bar screen for ridding of objects of large sizes present in waste water system stream;

(b) passing the waste water coming through said bar screening stage to a predetermined number aerated grit chambers for introducing systematic aeration into said waste water influent and gritting said waste water influent in order to remove materials alike from said waste water stream;

(c) treating said waste water coming out of said aerated grit chamber with a primary sedimentation step for separating out most suspended solids therein;

(d) passing said waste water stream after the treatment of said primary sedimentation step to a predetermined number of secondary aeration basins for a biological aeration process wherein activated sludge is introduced into said basins;

(e) injecting a cationic polymer into the waster water coming out of said aeration basins for recycling said cationic polymer through a retention activation sludge line to control nocardia foaming; and (f) passing said waste water stream after the injection of said cationic polymer to a predetermined number of clarifiers for clarifying treatment, in which the addition of said cationic polymer to the secondary-treated waste water coming out of said secondary aeration basins is operated before said waste water entering into said clarifiers, so as to displace nocardia floc and prevent foaming by an interaction with the nocardia floc and its hydrophilic nature, which causes bubbles in foam to collapse, and thus an effluent with nocardia losing its buoyancy and defoaming effect is achieved.

2. A nocardia foaming controlling method of waste water treatment, as recited in claim 1, wherein, in step (e), said cationic polymer is injected into the waster water at a mixed liquor channel.

3. A nocardia foaming controlling method of waste water treatment, as recited in claim 1, in step (e), said injecting cationic polymer having a dose of 0.5 ppm.

4. A nocardia foaming controlling method of waste water treatment, as recited in claim 1, wherein, in step (e), said cationic polymer is injected into the waster water at a head-end of said aeration basins.

5. A nocardia foaming controlling method of waste water treatment, as recited in claim 1, wherein, in step (e), said cationic polymer is injected into the waste water by spraying on a top of each said aeration basin.

6. A nocardia foaming controlling method of waste water treatment, as recited in claim 1, wherein, in step (e), said cationic polymer is injected into the waste water by adding said cationic polymer to said retention activation sludge line by means of a cationic polymer injection line which comprises a polymer tank for storing said cationic polymer, a mixing pump for pumping said cationic polymer out of said polymer tank, a mixing tank for mixing and storing said cationic polymer therein, a dosing pump for making dose of cationic polymer with 0.5 ppm and injecting to said retention activation sludge line through a PVC piping.

* * * * *